(12) United States Patent
Jenset

(10) Patent No.: US 12,026,121 B2
(45) Date of Patent: Jul. 2, 2024

(54) DETERMINATION OF A CONFIGURATION OF A BATTERY PACK

(71) Applicant: WÄRTSILÄ FINLAND OY, Vaasa (FI)

(72) Inventor: Frode Jenset, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 269 days.

(21) Appl. No.: 17/566,270

(22) Filed: Dec. 30, 2021

(65) Prior Publication Data

US 2022/0121615 A1   Apr. 21, 2022

Related U.S. Application Data

(63) Continuation of application No. PCT/FI2019/050522, filed on Jul. 2, 2019.

(51) Int. Cl.
*G06F 15/177* (2006.01)
*G06K 7/10* (2006.01)
(Continued)

(52) U.S. Cl.
CPC ....... *G06F 15/177* (2013.01); *G06K 7/10297* (2013.01); *H04B 5/77* (2024.01);
(Continued)

(58) Field of Classification Search
CPC .. G06F 15/177; G06K 7/10297; H04B 5/006; H04Q 9/00; H04Q 2209/47; H04Q 2209/86
See application file for complete search history.

(56) References Cited

U.S. PATENT DOCUMENTS 9,079,505 B1 *   7/2015   Hyde ............... G08G 1/202
9,586,541 B2     3/2017   Berg et al.
(Continued)

FOREIGN PATENT DOCUMENTS

EP    2797336 A2    10/2014
JP    2014203719 A  10/2014

OTHER PUBLICATIONS

International Search Report (PCT/ISA/210) and Written Opinion (PCT/ISA/237) mailed on Feb. 7, 2020, by the European Patent Office as the International Searching Authority for International Application No. PCT/FI2019/050522.

*Primary Examiner* — Aurel Prifti
(74) *Attorney, Agent, or Firm* — BUCHANAN INGERSOLL & ROONEY PC

(57) ABSTRACT

A computer implemented method, a control unit and a computer program for determining a configuration of a battery pack having one or more battery modules configured to be operationally connected as a string of battery modules, wherein a battery module includes a radio frequency identification, RFID, reader configured to read a radio frequency identification, RFID, tag of an adjacent battery module, by receiving first data from a first battery module (BM1), wherein the first data includes a module identifier of the first battery module (BM1) associated with second data of a second battery module (BM2) adjacent to the first battery module (BM1), the second data including at least a module identifier of the second battery module (BM2); and determining the configuration of the battery pack based on the first and second data.

16 Claims, 9 Drawing Sheets

(51) Int. Cl.
*H04B 5/77* (2024.01)
*H04Q 9/00* (2006.01)

(52) U.S. Cl.
CPC .......... *H04Q 9/00* (2013.01); *H04Q 2209/47* (2013.01); *H04Q 2209/86* (2013.01)

(56) References Cited

U.S. PATENT DOCUMENTS

| | | | | |
|---|---|---|---|---|
| 9,711,977 B2* | 7/2017 | Kang | ...................... | H04Q 9/00 |
| 10,756,393 B2* | 8/2020 | Lim | ..................... | H01M 10/425 |
| 11,038,216 B2* | 6/2021 | Kwon | ....................... | H02J 7/00 |
| 11,457,018 B1* | 9/2022 | Bhatnagar | ............. | H04L 51/212 |
| 11,509,144 B2* | 11/2022 | Liu | ..................... | H02J 7/00304 |
| 2005/0136301 A1* | 6/2005 | Knaggs | ............. | H01M 8/04447 |
| | | | | 429/432 |
| 2007/0008141 A1* | 1/2007 | Sweetland | ............ | H01M 10/42 |
| | | | | 340/572.7 |
| 2011/0258471 A1* | 10/2011 | Daniel | ..................... | H04Q 9/00 |
| | | | | 713/340 |
| 2012/0206102 A1* | 8/2012 | Okamura | ................ | H04Q 9/00 |
| | | | | 320/112 |
| 2012/0211569 A1* | 8/2012 | Krawczewicz | ... | H01M 10/4257 |
| | | | | 235/492 |
| 2015/0370745 A1* | 12/2015 | Eckerdt | .................. | H04W 4/80 |
| | | | | 710/105 |
| 2016/0020622 A1* | 1/2016 | Kwon | ................... | H02J 7/0013 |
| | | | | 320/128 |
| 2016/0099590 A1* | 4/2016 | Velderman | ............... | G07F 7/06 |
| | | | | 320/113 |
| 2016/0352109 A1* | 12/2016 | Park | ....................... | B60L 58/10 |
| 2017/0192061 A1* | 7/2017 | Park | ....................... | H02J 7/005 |
| 2018/0175638 A1* | 6/2018 | Zhu | ..................... | H01M 50/204 |
| 2019/0081372 A1* | 3/2019 | Capati | ................ | H01M 50/516 |
| 2019/0181656 A1* | 6/2019 | Cooper | ................ | H02J 7/0016 |
| 2019/0285703 A1* | 9/2019 | Juva | ................ | H02J 7/00047 |
| 2019/0393560 A1* | 12/2019 | Chang | ................ | H01M 50/204 |
| 2020/0076013 A1* | 3/2020 | Sato | ..................... | H01M 10/48 |
| 2020/0103467 A1* | 4/2020 | Lee | ..................... | G01R 31/371 |
| 2020/0359504 A1* | 11/2020 | Bae | ....................... | H05K 1/189 |
| 2021/0339649 A1* | 11/2021 | Ueno | ................ | H02J 7/007194 |
| 2022/0237393 A1* | 7/2022 | Chung | ............... | G06K 19/0723 |
| 2022/0237424 A1* | 7/2022 | Duffy | ................ | G06K 19/0723 |
| 2022/0278379 A1* | 9/2022 | Hwang | ............. | H01M 10/4221 |
| 2022/0360091 A1* | 11/2022 | Nguyen | ................ | B60L 58/10 |
| 2023/0019346 A1* | 1/2023 | Li | ........................ | H04W 40/22 |

* cited by examiner

DETERMINATION OF A CONFIGURATION OF A BATTERY PACK

RELATED APPLICATION

This application claims priority as a continuation application under 35 U.S.C. § 120 to PCT/FI2019/050522 filed as an International Application on Jul. 2, 2019 designating the U.S., the entire content of which is hereby incorporated by reference in its entirety.

FIELD

The present disclosure concerns in general the technical field of battery packs. More particularly, the present disclosure relates to solutions for determining configurations of the battery pack.

BACKGROUND INFORMATION

Today electrical energy storage solutions are brought in various application areas in addition to ones already known. For example, vehicles are equipped with batteries for supplying electrical energy to an electric motor residing in the vehicle. Moreover, other entities, such as buildings, can be equipped with batteries which can be taken into use if a power failure occurs. The battery solutions nowadays are often established as battery packs having a plurality of battery cells included in a space, such as in a housing. The battery cells can be identical, arranged in series or parallel or in any mixture of both, to provide desired voltage in the application area. In order to control the battery pack, a control unit can be arranged in the battery pack for enabling a battery management.

Identification of the battery cells within the battery pack can be required in various situations. For example, in a situation where it is recognized, in one manner or other, that a performance of at least one battery cell is degraded it is important to identify the one or more battery cells not operating properly. The identification can include, among others, a determination of a position of the battery cell in the battery pack. By determining the position of the battery cell in question it is possible to take maintenance actions in an efficient manner with respect to a battery cell not operating properly.

U.S. Patent document 9,586,541 B2 discloses a solution for identifying a particular battery cell within an application. The solution is based on a resistor divider network in which by measuring voltages in between resistors of the resistor divider network associated with the battery cells, and based on voltage variations between the measurement points, it is possible to identify each cell uniquely.

The existing solutions are applicable as such, but alternative solutions would be desirable to improve, at least in part, a determination positions of battery cells in the battery pack structure.

SUMMARY

A computer implemented method is disclosed for determining a configuration of a battery pack having one or more battery modules configured to be operationally connected as a string of battery modules, wherein a battery module includes a radio frequency identification, RFID, reader configured to read a radio frequency identification, RFID, tag of an adjacent battery module, the method comprising: receiving first data from a first battery module (BM1), wherein the first data includes a module identifier of the first battery module (BM1) associated with second data of a second battery module (BM2) adjacent to the first battery module (BM1), the second data including at least a module identifier of the second battery module (BM2); and determining the configuration of the battery pack based on the first and second data.

A control unit is also disclosed for determining a configuration of a battery pack having one or more battery modules configured to be operationally connected as a string of battery modules, wherein a battery module includes a radio frequency identification, RFID, reader configured to read a radio frequency identification, RFID, tag of an adjacent battery module, the control unit comprising: at least one processor; and at least one memory including computer program code; the at least one memory and the computer program code being configured to, with the at least one processor, cause the control unit to: receive first data from a first battery module (BM1), wherein the first data includes a module identifier of the first battery module (BM1) associated with second data of a second battery module (BM2) adjacent to the first battery module (BM1), the second data including at least a module identifier of the second battery module (BM2); and determine the configuration of the battery pack based on the first and second data.

A computer program embodied on a computer readable medium is also disclosed containing computer executable program code, which code, when executed by at least one processor of a control unit, causes the control unit to: receive first data from a first battery module (BM1), wherein the first data includes a module identifier of the first battery module (BM1) associated with second data of a second battery module (BM2) adjacent to the first battery module (BM1), the second data including at least a module identifier of the second battery module (BM2); and determine the configuration of the battery pack based on the first and second data.

BRIEF DESCRIPTION OF FIGURES

Exemplary embodiments of the invention are illustrated by way of example, and not by way of limitation, in the figures of the accompanying drawings, wherein.

DETAILED DESCRIPTION

Figure 1:
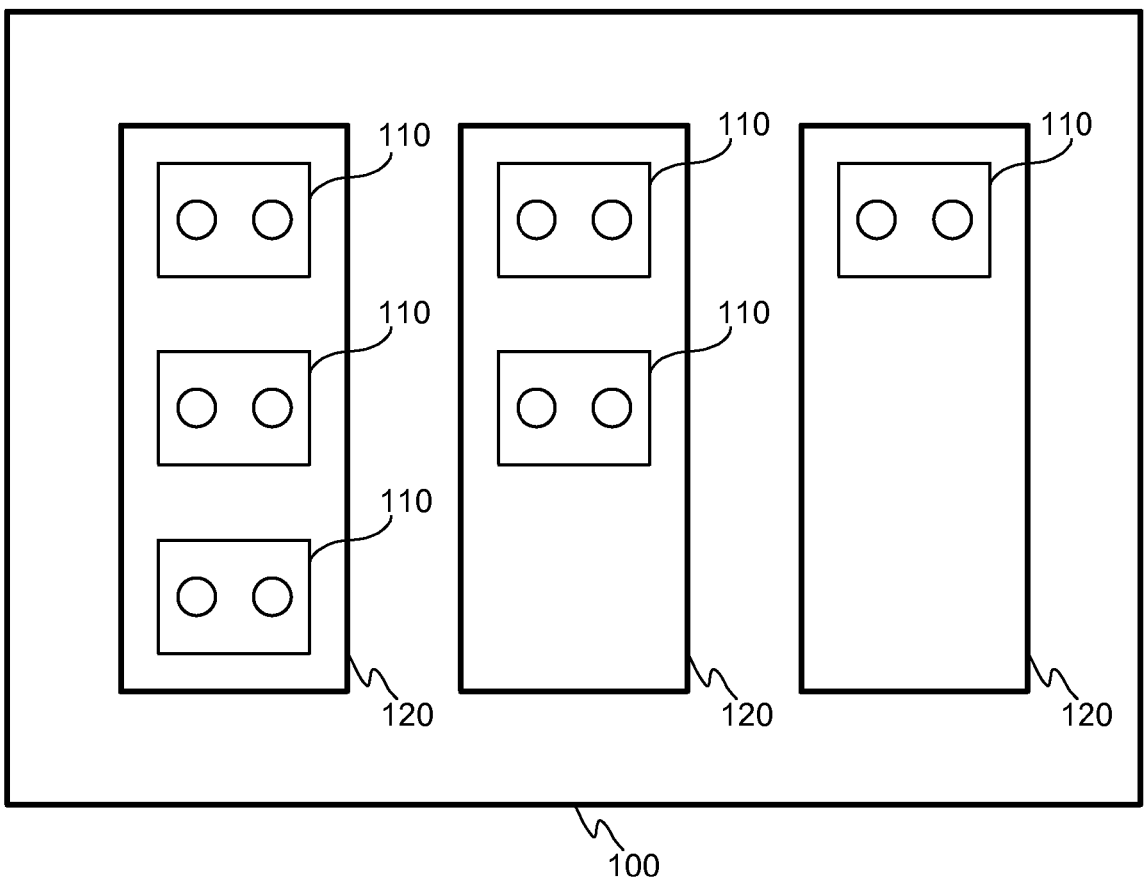
FIG. 1 illustrates schematically an exemplary battery pack.

The following discussion begins with a discussion intended to provide a basic understanding of some aspects of various exemplary embodiments. This initial discussion is not an extensive overview nor is it intended to identify key or critical elements or to delineate the scope of the disclosure. Rather, concepts are hereby disclosed initially in a simplified form as a prelude to a more detailed description of exemplifying embodiments.

A computer implemented method, a control unit and a computer program for determining a configuration of a battery pack are disclosed herein.

According to a first aspect, a computer implemented method for determining a configuration of a battery pack having one or more (e.g., a plurality) of battery modules configured to be operationally connected as a string of battery modules is provided, wherein a battery module includes a radio frequency identification, RFID, reader configured to read a radio frequency identification, RFID, tag of an adjacent battery module. An exemplary method can include: receiving first data from a first battery module, wherein the first data includes module identifier of the first battery module associated with second data of a second battery module adjacent to the first battery module, the second data including at least module identifier of the second battery module; and determining the configuration of the battery pack based on the first and second data.

The method can include: receiving data indicating a number of the battery modules belonging to the battery pack; and determining the configuration of the battery pack using the data indicating the number of the battery modules belonging to the battery pack.

For example, the configuration of the battery pack can be determined by detecting an identifier of a frame tag as the second data received from the first battery module and applying a known position of the frame tag in the configuration of the battery pack in the determination.

Further, the configuration of the battery pack can be determined by detecting an identifier of a RFID control reader as the first data and applying a known position of the RFID control reader in the configuration of the battery pack in the determination.

The data received from the first battery module can include data having at least one further identifier received from at least one further battery module.

The configuration of the battery pack can be determined by detecting an identifier of the RFID control reader as the first data, and by detecting an identifier of a frame tag as the second data received from a battery module of the string of battery module. For example, the method can include: determining data indicating a number of the battery modules belonging to the string of battery modules. The configuration of the battery pack can be determined by applying the data indicating the number of the battery modules in the determination. The battery pack can include the string of battery modules.

Generally speaking, the battery module can, for example, correspond to the battery cell.

Alternatively or in addition, the battery pack can, for example, correspond to the battery module.

According to a second aspect, a control unit for determining a configuration of a battery pack including one or more (e.g., a plurality) of battery modules configured to be operationally connected as a string of battery modules is provided, wherein a battery module includes a radio frequency identification, RFID, reader configured to read a radio frequency identification, RFID, tag of an adjacent battery module, the control unit including: at least one processor; and at least one memory including computer program code; the at least one memory and the computer program code configured to, with the at least one processor, cause the control unit to: receive first data from a first battery module, wherein the first data includes a module identifier of the first battery module associated with second data of a second battery module adjacent to the first battery module, the second data including at least module identifier of the second battery module; and determine the configuration of the battery pack based on the first and second data.

The control unit can be configured to: receive data indicating a number of the battery modules belonging to the battery pack; and determine the configuration of the battery pack using the data indicating the number of the battery modules belonging to the battery pack.

The control unit can also be configured to determine the configuration of the battery pack by detecting an identifier of a frame tag as the second data received from the first battery module and applying a known position of the frame tag in the configuration of the battery pack in the determination.

Still further, the control unit can be configured to determine the configuration of the battery pack by detecting an identifier of a RFID control reader as the first data and applying a known position of the RFID control reader in the configuration of the battery pack in the determination.

Moreover, the control unit can be configured to receive further data from the first battery module, the further data including at least one further identifier received from at least one further battery module.

The control unit can include a RFID control reader, wherein the control unit can be configured to determine the configuration of the battery pack by detecting an identifier of the RFID control reader as the first data, and by detecting an identifier of a frame tag as the second data received from a battery module of the string of battery modules. The control unit can be configured to determine data indicating a number of the battery modules belonging to the string of battery modules. For example, the control unit can be configured to determine the configuration of the battery pack by applying the data indicating the number of the battery modules in the determination.

The battery pack can, for example, include the string of battery modules.

According to a third aspect, a computer program embodied on a computer readable medium containing computer executable program code is provided, which code, when executed by at least one processor of a control unit, will cause the control unit to: receive first data from a first battery module, wherein the first data includes a module identifier of the first battery module associated with second data of a second battery module adjacent to the first battery module, the second data including at least a module identifier of the second battery module; and determine the configuration of the battery pack based on the first and second data.

As referenced herein, the expression "a number of" refers herein to any positive integer starting from one, e.g. to one, two, or three.

As referenced herein, the expression "a plurality of" refers herein to any positive integer starting from two, e.g. to two, three, or four.

Various exemplifying and non-limiting embodiments of the disclosure both as to constructions and to methods of operation, together with additional objects and advantages thereof, will be described in the following description of specific exemplifying and non-limiting embodiments when read in connection with the accompanying drawings.

The verbs "to comprise" and "to include" are used in this document as open limitations that neither exclude nor require the existence of unrecited features. The features of the various embodiments, including those encompassed by dependent claims, are mutually freely combinable unless otherwise explicitly stated. Furthermore, it is to be understood that the use of "a" or "an", i.e. a singular form, throughout this document does not exclude a plurality.

The specific examples provided in the following description are not to be construed as limiting the scope and/or the applicability. Lists and groups of examples provided in the description herein are not exhaustive unless otherwise explicitly stated.

To operate an electric vehicle, such as a marine vessel, an enormous amount of power can be required. That is why electric vehicles, such as marine vessels or power plants with balancing backup, can use as many as tens of thousands of battery cells. The composition of a battery might vary slightly depending on the types of electric vehicles, but generally electric vehicle batteries could be configured to be composed of cells, modules and a pack.

In fact, to safely and efficiently manage the countless battery cells mounted in one vehicle, such as marine vessel, the cells are installed in forms of modules and packs. Simply put, cells, modules and packs are units of gathered batteries. A cluster of cells make up a module and a cluster of modules make up a battery pack. Ultimately, in an electric vehicle, one form of battery is installed: a battery pack.

An exemplary cell understood to be the basis of a battery possesses high capacity per unit volume in order to show maximum performance in a restricted area within a vehicle or power plant and the cell also has much longer lifespan compared to batteries used in consumer mobile devices. Cell-level identification and service can be more important in vessels and power plants than in consumer products, for example. Furthermore, cells should be configured to endure shocks transmitted during the drive and possess high reliability & stability to the extent of being able to withstand high and low temperatures.

When a number of cells are put into a frame to protect them better from external shocks such as heat or vibration, this can be called as a battery module. And when a number of battery modules come together with a BMS (Battery Management System) and a cooling device that control and manage battery's temperature, voltage, etc., this can be called as a battery pack. This is how numerous cells are installed in an electric vehicle through the form of a pack.

The above described concepts are schematically illustrated in FIG. 1 in which a battery pack 100 includes a plurality of battery modules 120 each having a number of battery cells 110. The configuration schematically depicted in FIG. 1 is a non-limiting example and the configuration can vary substantially. For example, the battery pack 100 can include only one battery cell 110 configured in a manner as described herein, which means that the battery pack 100 corresponds to the battery module 120 and the battery module 120 corresponds to the battery cell 110 with the definitions as described. As also derivable from FIG. 1, each battery module 120 can include a various number of battery cells 110.

Figure 2:
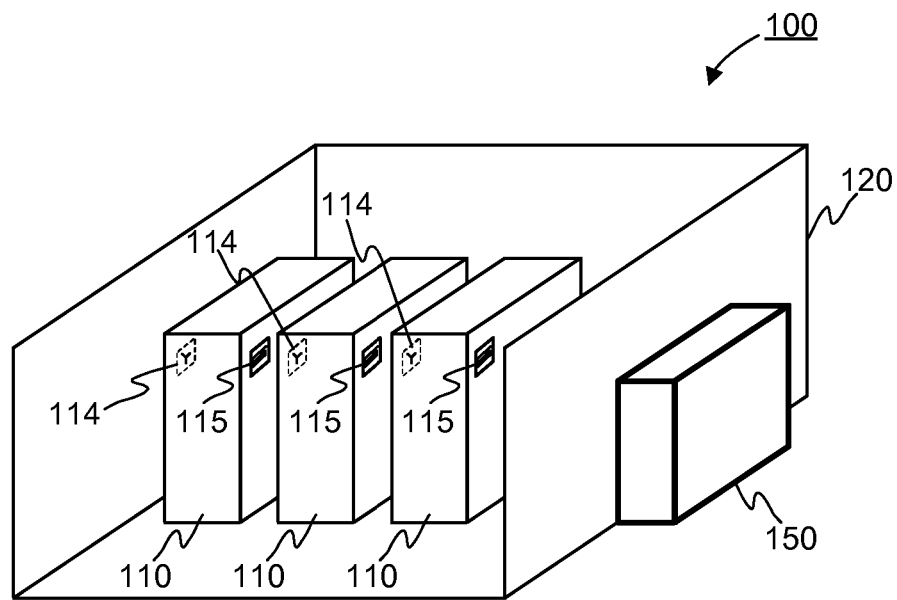
FIG. 2 illustrates schematically a system according to an exemplary embodiment.

For describing at least some aspects of exemplary embodiments, FIG. 2 is referred to. FIG. 2 illustrates schematically a system according to an exemplary embodiment as a block diagram. The system according to the example can include a battery module 120 including (e.g., consisting of) a plurality of battery cells 110 and a control unit 150. The battery module 120 can be implemented as a housing for a number of battery cells 110. At least some of the plurality of the battery cells 110 are equipped with a communication device suitable for a short range communication. For sake of clarity, the communication device in a context of the present disclosure can, e.g., be a RFID (Radio Frequency Identification) module having a RFID tag 115 and a RFID reader 114. The RFID tag 115 can have electronically stored information, such as an identifier of the RFID tag 115 in question.

The information is readable with a RFID reader 114 which can send a signal to the RFID tag 115 and read its response. In the described manner it is possible, e.g., to identify an entity into which the RFID module is mounted to.

Hence, in an implementation as illustrated in FIG. 2 the RFID module of a battery cell 110 can communicate with at least one other RFID module of another battery cell 110. Still further, the RFID modules, and particularly the reader portion 114 therein, can be arranged to communicate with the control unit 150 either directly or indirectly. can direct communication can, e.g., be implemented with a wired or wireless communication interface implemented both in each RFID reader 114 and the control unit 150. The indirect communication, in turn, can be implemented by arranging one RFID module to communicate with the control unit 150 through at least one other RFID module. Some non-limiting examples of an implantation utilizing a wired communication can be such that a data bus, such as a CAN bus, is arranged between the control unit 150 and the RFID readers 114.

Alternatively or in addition, a power line connecting, e.g., the batteries and the control unit 150 can be used. In such an implementation, the RFID module, and especially the RFID reader 114 is equipped with an applicable interface to access the power line. On the other hand, the wireless communication van be implemented with any known short range communication protocol or a dedicated wireless communication implementation by arranging desired and/or necessary devices and interfaces to the communicating entities.

As mentioned, in various embodiments the battery cells 110 can be arranged as battery modules 120, the battery modules 120 each including a number of battery cells 110. In such an embodiment the RFID module can be arranged to each battery module for identifying a number of battery cells 110 arranged in the module in question. Correspondingly, the battery modules 120 can form a sub-system in which is battery cell 110 is equipped with RFID module wherein each battery module 120 is further equipped with a control unit 150 corresponding the one as described in the context of FIG. 1. According to exemplary embodiments, one of the control units 150, or a separate control unit 150, can be arranged to operate as a master control unit for communicating and operating as is described herein.

Figure 3:
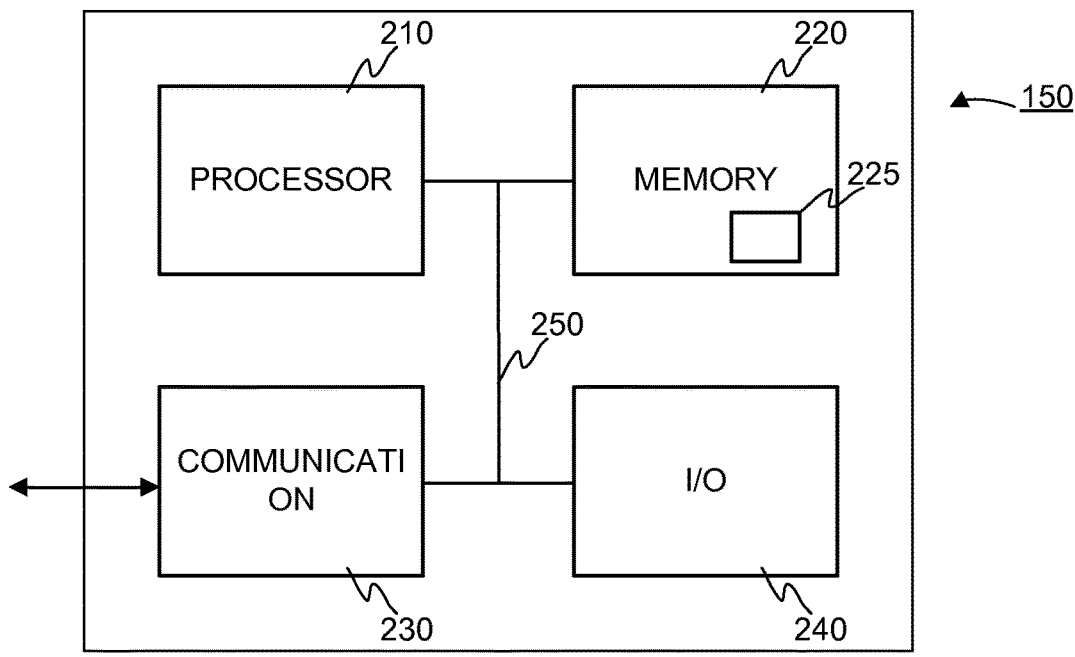
FIG. 3 illustrates schematically a control unit according to an exemplary embodiment.

As discussed herein, the system can include a control unit 150 for communicating with the RFID modules as well as for processing of data. FIG. 3 illustrates schematically as a block diagram an example of the control unit 150 applicable in the battery pack 100. The block diagram of FIG. 3 depicts some components of an apparatus that can be employed to implement the control unit 150.

The apparatus can include a processor 210 and a memory 220. The memory 220 can store data and computer program code 225. The apparatus can include communication means 230 for wired or wireless communication with other apparatuses and/or user I/O (input/output) components 240 that can be arranged, together with the processor 210 and a portion of the computer program code 225, to provide the user interface for receiving input from a user and/or providing output to the user. For example, the user I/O components can include user input means, such as one or more keys or buttons, a keyboard, a touchscreen or a touchpad, etc. The user I/O components can include output means, such as a display or a touchscreen. The components of the apparatus can be communicatively coupled to each other via a bus 250 that enables transfer of data and control information between the components.

The memory 220 and a portion of the computer program code 225 stored therein can be further arranged, with the processor 210, to cause the apparatus, e.g., the control unit 150, to perform a method as will be described in a forthcoming description. The processor 210 can be configured to read from and write to the memory 220. Although the processor 210 is depicted as a respective single component, it can be implemented as respective one or more separate processing components. Similarly, although the memory 220 is depicted as a respective single component, it can be implemented as respective one or more separate components, some or all of which can be integrated/removable and/or can provide permanent/semi-permanent/dynamic/cached storage.

The computer program code 225 can include computer-executable instructions that implement functions that correspond to steps of the method as will be described when loaded into the processor 210. As an example, the computer program code 225 can include a computer program including (e.g., consisting of) one or more sequences of one or more instructions. The processor 210 is able to load and execute the computer program by reading the one or more sequences of one or more instructions included therein from the memory 220. The one or more sequences of one or more instructions can be configured to, when executed by the processor 210, cause the apparatus to perform the method as described herein. Hence, the apparatus can include at least one processor 210 and at least one memory 220 including the computer program code 225 for one or more programs, the at least one memory 220 and the computer program code 225 configured to, with the at least one processor 210, cause the apparatus to perform the method described herein.

The computer program code 225 can be provided, e.g., a computer program product including at least one computer-readable non-transitory medium having the computer program code 225 stored thereon, which computer program code 225, when executed by the processor 210 causes the apparatus to perform a method as disclosed herein. The computer-readable non-transitory medium can include a memory device or a record medium such as a CD-ROM, a DVD, a Blu-ray disc or another article of manufacture that tangibly embodies the computer program. As another example, the computer program can be provided as a signal configured to reliably transfer the computer program.

Still further, the computer program code 225 can include a proprietary application, such as computer program code for battery management. The proprietary application can be a client application of a service whose server application is running on a server apparatus of the system. The proprietary application can, for example, detect an anomaly within the battery pack 100, identify the battery cell 110, or a battery module 120, that the anomaly is related to, and automatically generate a service task associated information of the anomaly and the location of the battery cell 110 using the automatic battery location configuration.

Any of the programmed functions mentioned can also be performed in firmware and/or hardware adapted to or programmed to perform the necessary tasks.

The exemplary control unit 150 as described can be arranged to perform its task with respect to one or more battery modules 120 each having one or more battery cells 110.

Figure 4:
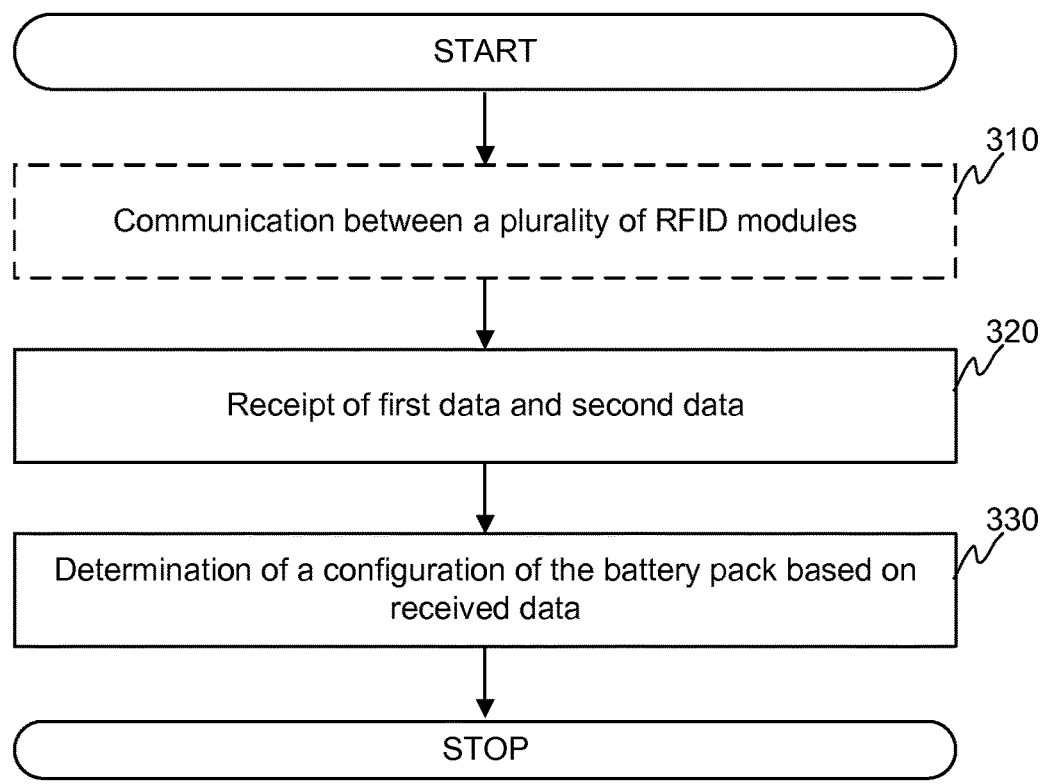
FIG. 4 illustrates schematically a method according to an exemplary embodiment.

Next, a method in accordance with an exemplary embodiment is described by referring to FIG. 4 for automatically determining a configuration of battery pack 100. A step 310 as illustrated in the FIG. 4 can be performed by one or more RFID modules and an exemplary aim of the step 310 is to establish a desired or necessary amount of information for performing the method in accordance with the exemplary embodiment.

In the mentioned step a plurality of RFID modules associated with battery cells 110 of the battery pack 100 are arranged to communicate with each other. The communication can, e.g., be initiated with a trigger signal generated by the control unit 150 to the RFID modules of the battery cells 110.

Depending on a type of RFID modules, and especially the RFID tags 115 therein, a receipt of the trigger signal by the RFID reader 114 of the RFID module can cause at least one of the following. Either the RFID reader 114 can generate a radio signal to activate at least one RFID tag 115 to transmit information to the RFID reader 114. Alternatively, the receipt of the trigger signal can cause the RFID reader 114 to obtain data carried in a signal generated by the RFID tag 115.

The above described alternative mechanisms can be dependent on if the RFID tag 115 of the RFID module is passive (RFID tag 115 becomes active in response to an interrogating radio wave) or active (RFID tag 115 equipped with a power source). Hence, in step 310 the RFID reader 114 of a first RFID module can be arranged to communicate with a RFID tag 115 of at least one second RFID module. In the communication the RFID reader 114 of the first RFID module can receive at least an identifier transmitted by the RFID tag 114 of the at least one second RFID module, the identifier representing the battery module 120 into which the RFID tag 115 of the at least one second RFID module is associated. Hence, the RFID reader 114 of the first RFID module receives an identifier representing the battery module 120 belonging to the battery pack 100, such as a neighboring battery module 120, and the RFID reader 114 in question can be configured to associate its own identifier representing the identifier of a battery module 120 with the at least one identifier representing the identifier of a second battery module 120 received from the RFID tag 115 of the at least one second RFID module. The own module identifier can be called as a first data and the other module identifier can be called as the second data.

The association of the identifiers can be performed in any manner by means of which pieces of data can be combined together, such as by including them in a same data record in a predetermined manner. As a result, the RFID reader 114 of the first battery module 120 can possess first data including an identifier of the battery module 120 into which the RFID module 115 is associated to and at least one other second data including another identifier of at least one other battery module 110. In response to the described operation the RFID module possessing the data can be arranged to transmit the data to the control unit 150 by generating a signal over a predefined communication channel to the control unit 150.

Hence, the control unit 150 can be arranged, in step 320 as illustrated in FIG. 4, to receive signal carrying the first data and the second as described from a plurality of RFID modules. In response to a receipt of data the control unit 150, for example, the processor by executing a computer program code, can be caused to start determining 330 a configuration of the battery pack 100. The determination of the configuration can be performed by establishing a model of the configuration of the battery pack 100 including a plurality of the battery modules 120 based on the data received from the plurality of the battery modules 120.

The model can be established for generating a representation of mutual positions of the battery modules 120 in the battery pack 100. The establishment of the model can be performed by analyzing identifiers included in the received data, e.g., represented by the first data and the second data. The analysis can, e.g., be performed so that a first battery module 120 is determined on a basis of an identifier included in the first data. One or more other identifiers are also identified from the second pieces of data received by the control unit 150. Next, a second battery module 120 is determined on a basis of another identifier included in the second data. The operation described above is performed with respect to all battery modules 120 from which the data is received by the control unit 150.

Next, the control unit 150 can be arranged to compare if the data received from the plurality of battery modules 120 includes any same identifiers. Based on detections of the same identifier in data received from a plurality of battery modules 120 it can be concluded that the battery modules 120 are neighboring ones. In such a manner it is possible to establish a chain of the battery modules 120 belonging to the battery pack 100, and to determine the configuration of the battery pack 100. In an advantageous exemplary embodiment, the RFID readers 114 can be arranged to capture signals from only one RFID module adjacent to the RFID reader 114 in question on the basis of which the described method for determining the configuration can be established.

Moreover, in an exemplary implementation in which a RFID reader 114 of RFID module is capable of receiving signals from RFID tags 115 of RFID modules residing distantly, e.g., not only from at least one adjacent RFID module, but one or more RFID modules residing further than the adjacent ones, the RFID readers 114 can be arranged to include further information to the data including at least the identifier of the battery module 120 provided by the RFID tag 115. The further data can, e.g., include a value representing a signal strength of the received signal by the RFID reader 114. The experienced signal strength is dependent on the distant of the transmitter, e.g., the RFID tag 115, and by means of the value it is possible to create differentiation between the RFID tags 115. The differentiation, in turn, enables the control unit 150 to "understand" the mutual distances between the RFID modules associated with respective battery modules 120 and by applying the information on the signal strengths with the identifiers the control unit 150 can establish the model. For example, it can be determined the closest battery module 120 on the basis of the signal strength and to apply the decision-making with respect to the configuration as described. The above described way of including the further data, such as signal strength value can also be applied in an implementation in which only the neighboring RFID modules, or specifically the RFID tags 115, are detected.

Alternatively or in addition to the signal strength value some other, or additional, data can also be included in the data to be transmitted to the control unit 150. In some exemplary embodiments the RFID module can determine a direction from which at least the identifier data is received. The direction can be determined with respect to some reference value. By receiving the directional data together with the identifier data from the RFID module the control unit 150 can be arranged to differentiate the RFID tags 115 detected by a certain RFID module, and, hence, to determine the configuration of the battery pack 100 in more efficient way, e.g., by determining the adjacent battery module 120 on the basis of the directional data.

Generally speaking, as regards to distances between communicating entities some hardware can be configured and designed for maximizing read range, while other hardware is configured and designed to limit read range. For example, the battery modules 120 can be configured so that read range is limited but the control unit 150 can be configured to have read range maximized. For instance, antenna gain can be used for adjusting the read ranges. If an increased read range is needed, higher gain antennas can be used. On the other hand, if less read range is needed, lower gain antennas can be selected. Further, if the RFID tags 115 are read up close, very low gain proximity antennas can be used.

As is commonly known a higher gain antenna increases the power received from the RFID reader 114. If there is desire or need to make sure that the antennas have a longer "reach," then high gain antennas (e.g. 9 dBi, or higher) can be applied to. Due to application environment of the present disclosure battery cells 110 can require a tightly controlled configuration. For example, in systems where the RFID tag 115 will always be the same short distance away from the antenna, a high gain antenna simply isn't needed. Even so-called proximity scan can be used so as to not read RFID tags 115 too far away and a low gain proximity RFID antenna is perfect for such a situation. Hence, the higher the gain, the higher the range of the antenna, and vice versa. Additionally, lower gain antennas are smaller in size than high gain antennas; so, if in case application environment has size restrictions in terms of the antenna's dimensions, a lower gain RFID antenna can be experimented with and/or used.

Another option to the optimization of antenna gain can be to use antenna polarization. If RFID tags 115 are aligned with the polarization of the antenna, linear polarized antennas can be read farther than circular polarized antennas. If RFID tags 115 are not aligned with the polarization of the antenna, then circular polarized antennas read farther than linear polarized antennas.

A still further exemplary option can be to control how much power is sent to the antennas. The higher the dB number, the more increase read range, and vice versa. Because the power is measured in decibels (dB), the power will double (or be cut in half) for every 3 dB you increase (or decrease). For example, 27 dB is twice as powerful as 24 dB, and 30 dB is twice as powerful as 27 dB. Lastly, RFID reader's receive sensitivity settings can be set. If the RFID reader 114 is set to maximum sensitivity, it will report weaker RFID tag 115 signals (which can, for example, come from tags that are farther away, thus increasing read range); a lower sensitivity setting will ignore the weaker signals, thus decreasing read range.

As can be seen from the above there are various mechanisms to affect read ranges of the RFID readers 114. By adjusting the setup it is, e.g., possible to define the system so that each cell row is capable of "listening" to neighbor cells in the same row and, e.g., each of the first module 120 of each row is capable of "listening" to neighboring first module 120 of the next column. The cell here corresponds to a respective RFID tag 115.

According to various exemplary embodiments the control unit 150 can be arranged to determine a number of battery modules 120 included in the battery pack 100 it is arranged to monitor in the manner as described. The awareness of the number of the battery modules 120 can, e.g., be arranged so that information on the number of the battery modules 120 is stored in a memory 220 of the control unit 150, and the control unit 150 can be arranged to determine that it receives the signals comprising the data from the corresponding number of the RFID modules associated to the battery modules 120. Naturally, if one RFID module is arranged to represent a plurality of battery modules 120 it is taken into account in the arrangement. The awareness of the number of the battery modules 120 in the battery pack 100 also allows also the control unit 150 to set limits in the determination of the configuration, and in that manner a complexity in the calculation can be reduced. In an exemplary embodiment the control unit 150 can determine the number of the battery modules 120 by performing a calculation based on data received from the battery modules, for example.

Alternatively or in addition, the complexity of the calculation can be optimized by giving consideration to applied RFID modules and/or their positions in the battery modules 120 of the battery pack 100. Namely, by arranging so that either RFID tags 115 under monitoring or the RFID reader 114 of the RFID module or both are arranged to communicate only in a certain direction, it is possible to define at least one rule for determining a configuration of the battery pack 100. In other words, if at least one RFID reader 114 can receive signals only from certain direction, or from a certain directional beam, the positions of the RFID modules with respect to each other can be defined in an efficient manner. Naturally, the directions shall be defined so that the RFID readers 114 of the RFID modules receive signals from RFID tags 115 so that RFID readers 114 detect RFID tags 115 being common in order to be capable of establish the configuration by means of common detections. As indicated, the directional detection can, e.g., be achieved by selecting directional antennas either for RFID tags 115 or RFID readers 114 of the RFID modules and/or mounting them in the battery modules 120 in a manner that the directional detection can be achieved.

In a simple example of the determination of the configuration of the battery pack 100, such as schematically illustrated in FIG. 1, it can be arranged that each battery module 120 has only one neighbour on a side into which a RFID reader 114 of the RFID module associated to the battery module 120 in question. Respectively, a RFID tag 115 of a neighbouring battery module 120 is arranged on the other side, e.g., on the other battery module 120 so as to enable a communication between the RFID reader 114 of a first module and the RFID tag 115 of the second module.

Moreover, the positioning of the entities with respect to each other as well as technical parameters, such as described herein, can be adjusted so that each RFID reader 114 can only read a signal from one neighbouring RFID tag 115. This means that the outermost RFID reader 114 does not receive any signal, i.e. sets the data identifying the at least one other battery module in the signal from a RFID reader 114 null, based on which it is possible to conclude that the corresponding battery module 120 with which the RFID module 114 is associated with resides at one side (outmost) of the battery pack 100. Based on the mentioned detection the control unit 150 can start building up the configuration of the battery pack 100. In a similar manner, e.g., by limiting a capability to read a plurality of RFID tags 115 by the RFID readers 114, the configuration of the battery pack 100 can be determined in more complex structures of the battery packs 100. In other words, the build-up of the configuration of the battery pack 100 is based in relative positions of the RFID modules, e.g., the RFID readers 114 and RFID tags 115, associated to the battery module 120 of the battery pack 100.

Figure 5:
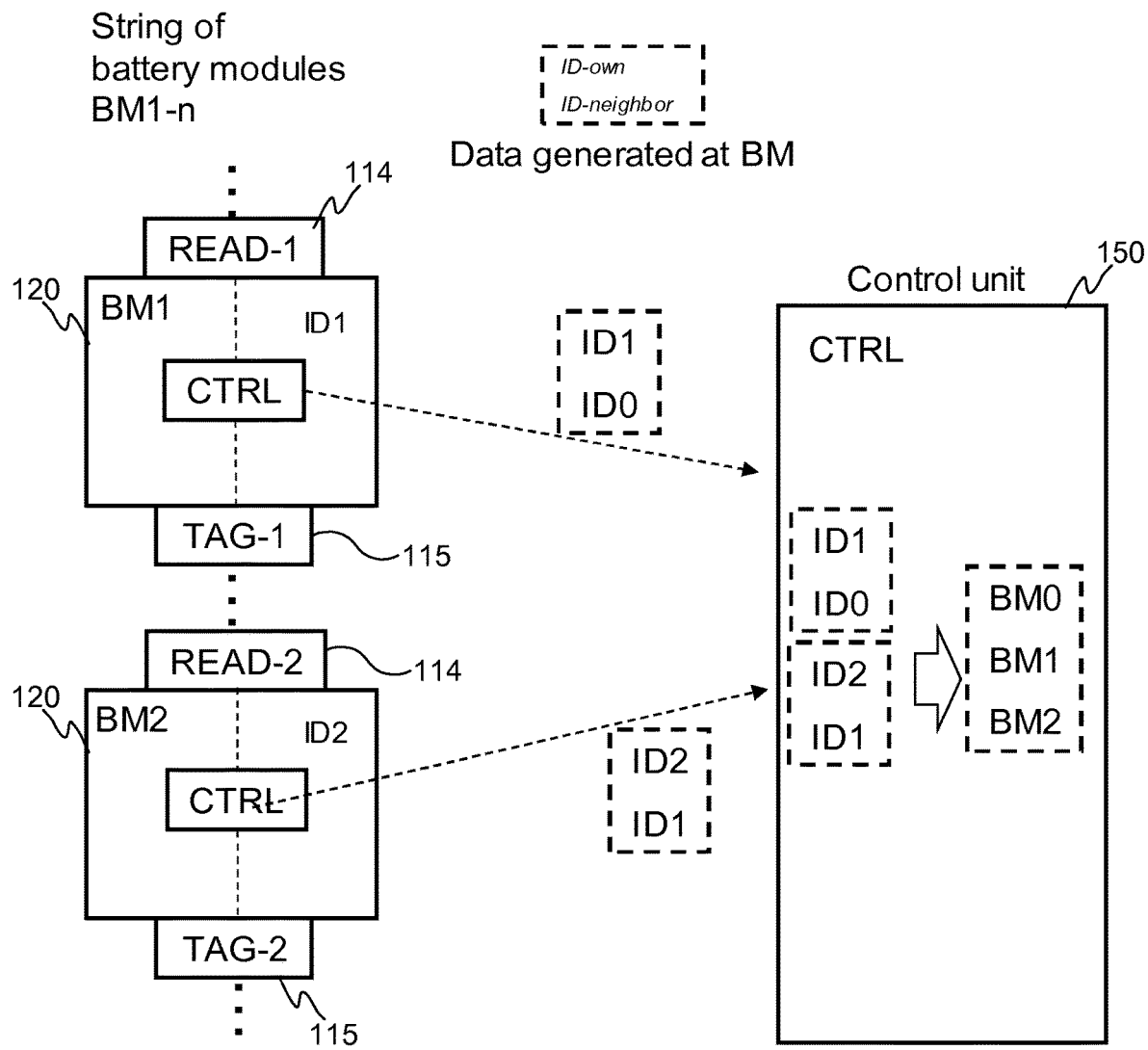
FIG. 5 illustrates schematically aspects relating to a determination of a configuration according to an exemplary embodiment.

For clarifying the determination of the configuration of the battery pack 100 reference is made to FIG. 5. The battery pack 100 includes a plurality of battery modules 120, referred as BM1 and BM2 in FIG. 5. The battery modules 120 are equipped with RFID modules including a RFID reader 114 and a RFID tag 115. The arrangement is such that the RFID reader 114 is arranged to communicate with a RFID tag 115 of an adjacent battery module 120 and to one direction only. The battery modules 120 include dedicated identifiers, referred as ID1 and ID2 in FIG. 5. Now, each battery module 120 can be arranged to detect a neighbouring battery module 120 and receive its identifier ID1, ID2, and to generate a data record including own identifier as a first data and an identifier of the neighbouring battery module 120 as a second data.

A non-limiting example of a format of the data record generated by the battery module 120 is schematically illustrated in FIG. 5 (ID-own; ID-neighbour). As a result, the battery modules 120, BM1, BM2, can be arranged to transmit data records to the control unit. The data record transmitted by the first battery module 120, BM1, can include data as follows: ID1; ID0 and the data record transmitted by the second battery module 120, BM2, can include data as follows: ID2; ID1. Correspondingly other battery modules 120 can provide corresponding data records to the control unit 150. In response to the receipt of the data records the control unit can start establishing a model of the configuration of the battery pack 100.

The above mentioned data records received from the first and from the second battery module 120, BM1, BM2 can include a common identifier, e.g., an identifier of the first battery module 120, ID1. The detection allows the control unit 150 to determine that a mutual order of the battery modules 120 on the basis of received data records is then BM0, BM1, BM2 (battery module 120 BM0 not illustrated in FIG. 5). Correspondingly, an order of the battery modules 120 in the string can be determined with respect to additional battery modules 120.

Figure 6A:
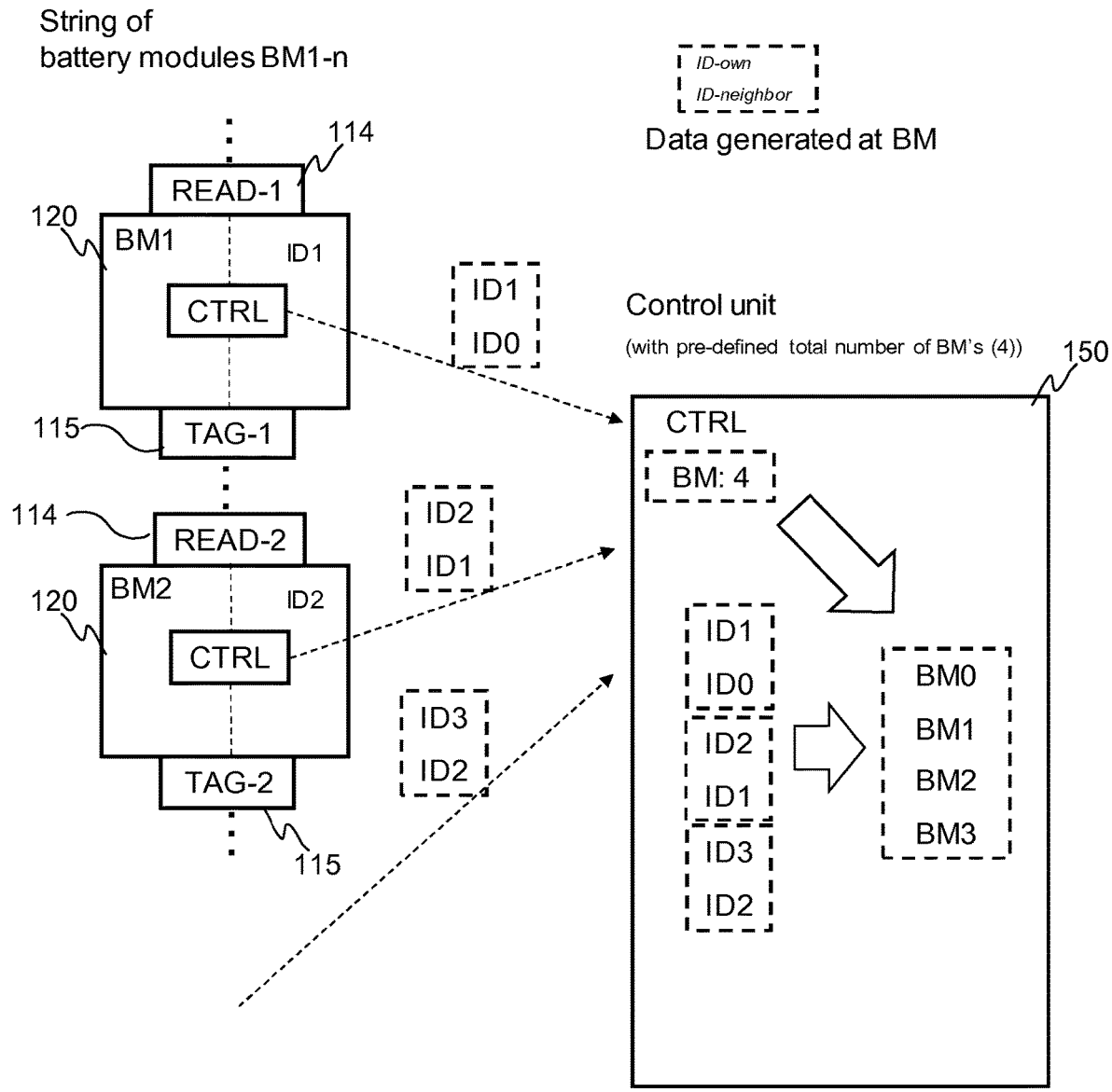
FIGS. 6A-6E illustrates schematically further aspects relating to a determination of a configuration according to an exemplary embodiment.

FIGS. 6A-6E schematically illustrate non-limiting examples of setups based on the principle as disclosed in FIG. 5 for determining the configuration of the battery pack in accordance with the present disclosure. The embodiments disclosed in FIG. 6A-6E are as follows:

FIG. 6A: The control unit 150 can be arranged to receive data, such as to access the data stored in a memory of the control unit 150, which indicates a number of battery modules 120 in the battery pack 100 whose configuration is to be determined. The awareness of the number of the battery modules 120 can be applied in the determination so that the control unit 150 can be arranged to start determining the configuration of the battery pack 100 in response to a receipt of data from all the battery modules 120 as well as the control unit 150 can establish a framework of the battery pack 100 with the information on the number of the battery modules 120 for placing the battery modules 120 in the framework, and in that manner to enhance the determination of the configuration.

Figure 6B:
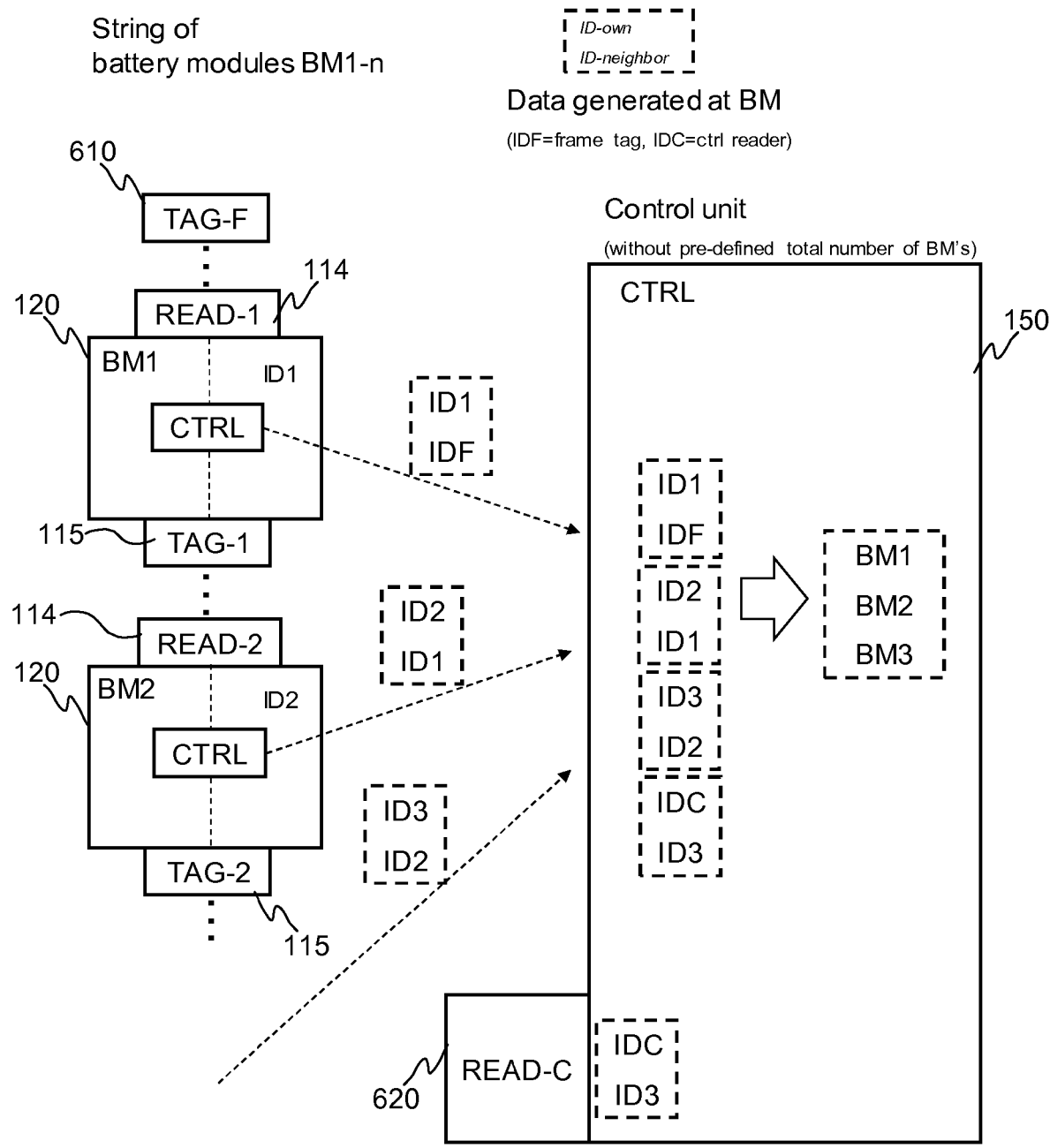

FIG. 6B: The exemplary implementation according to FIG. 6B is based on an idea that the control unit 150 does not know the number of battery modules 120 in the battery pack 100 in advance, but there is arranged a fixed tag, called as a frame tag 610 in the battery pack 100 suitable to be read by one RFID reader 114 of a battery module 120. Additionally, according to the exemplary embodiment a fixed RFID control reader 620 is arranged in the setup, such as in the frame structure or in the control unit 150, which is positioned in a known position for reading a tag residing in a certain position in the battery pack 100. Hence, the control unit 150 can accordingly receive two reference points to be used in the determination of the configuration of the battery pack 100. As the control unit can determine the identities of the reference points, e.g., the identity of the frame tag, IDF, and the identity of the control reader 620, IDC, from the data received by the control unit 150, it can position corresponding modules 120 in the battery pack 100 and use that information for positioning the other battery modules 120 in the battery pack 100. In such a manner the determination of the configuration of the battery pack 100 can be enhanced and the control unit 150 can be configured to determine the number of battery modules 120 in the battery pack 100.

Figure 6C:
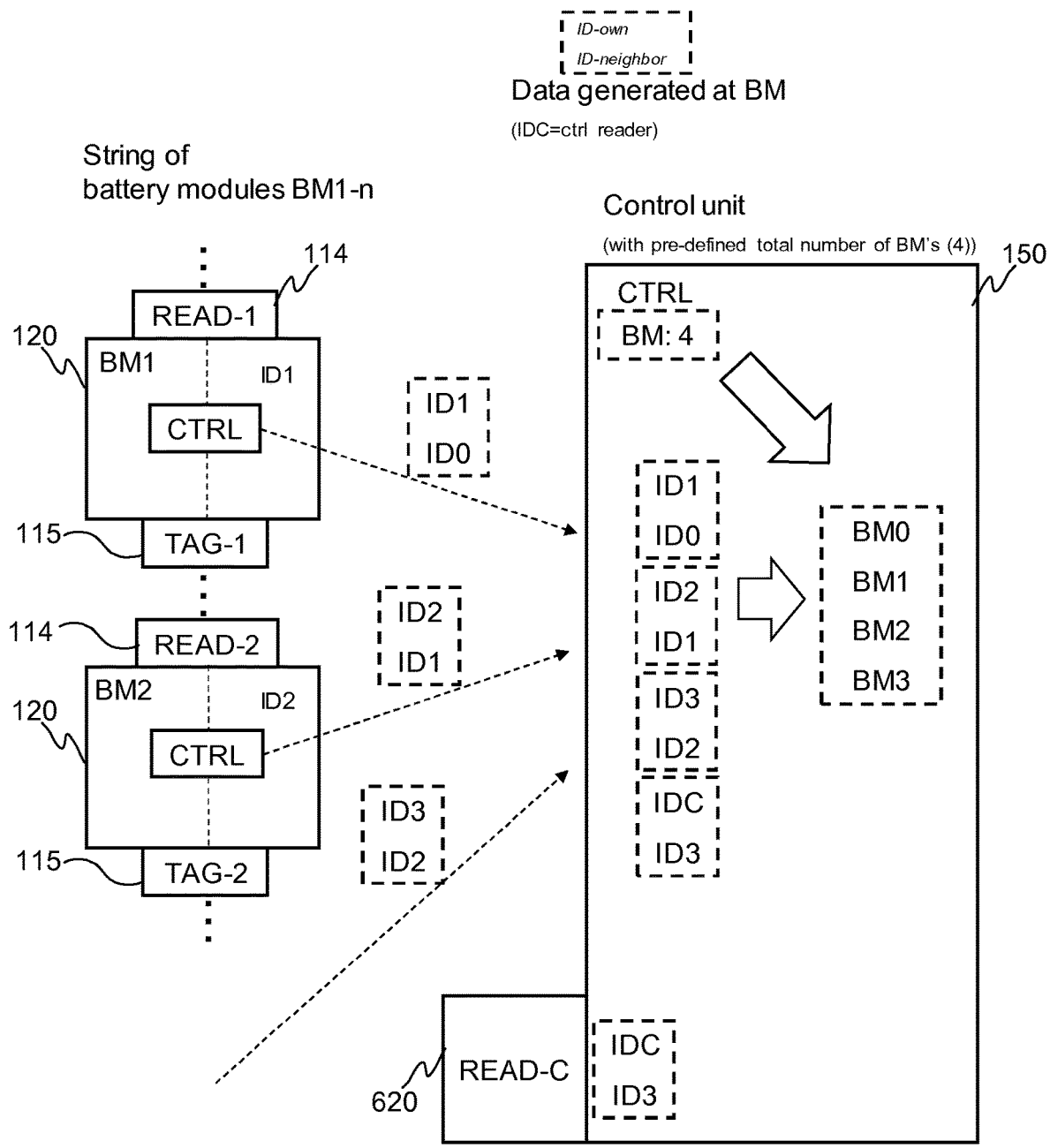

FIG. 6C: A further implementation as schematically depicted in FIG. 6C is based on an idea that the control unit 150 can receive, such as has access to, data indicating the number of battery modules 120 in the battery pack 100, and there is arranged a fixed RFID control reader 620 in the setup. The control reader 620 is positioned so that its position is known for reading a tag residing in a certain position in the battery pack 100. Hence, the control unit 150 can accordingly receive a reference point from the RFID control reader 620 and apply the information on the number of battery modules 120 belonging to the battery pack 100 in question and use these pieces of information in the determination of the configuration of the battery pack in an efficient manner.

Figure 6D:
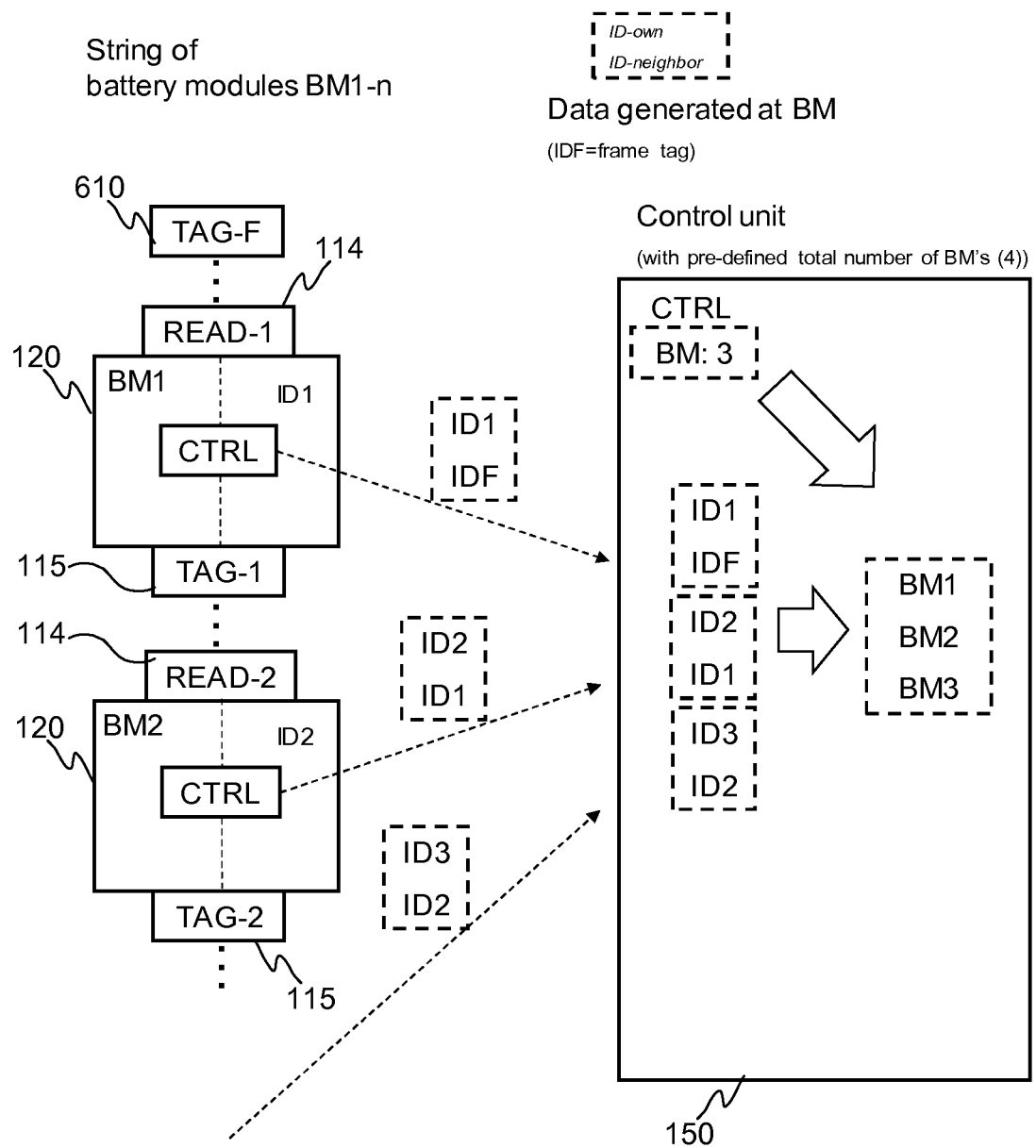

FIG. 6D: FIG. 6D illustrates an implementation which is based on an idea that the control unit 150 can receive, such as access to, data indicating the number of battery modules 120 in the battery pack 100, and there is arranged a frame tag 610 in the setup. The frame tag 610 is positioned so that its position is known by the control unit 150. Hence, the control unit 150 can accordingly receive a reference point from the frame tag 610 and apply the information on the number of battery modules 120 belonging to the battery pack 100 in question and use these pieces of information in the determination of the configuration of the battery pack in an efficient manner.

Figure 6E:
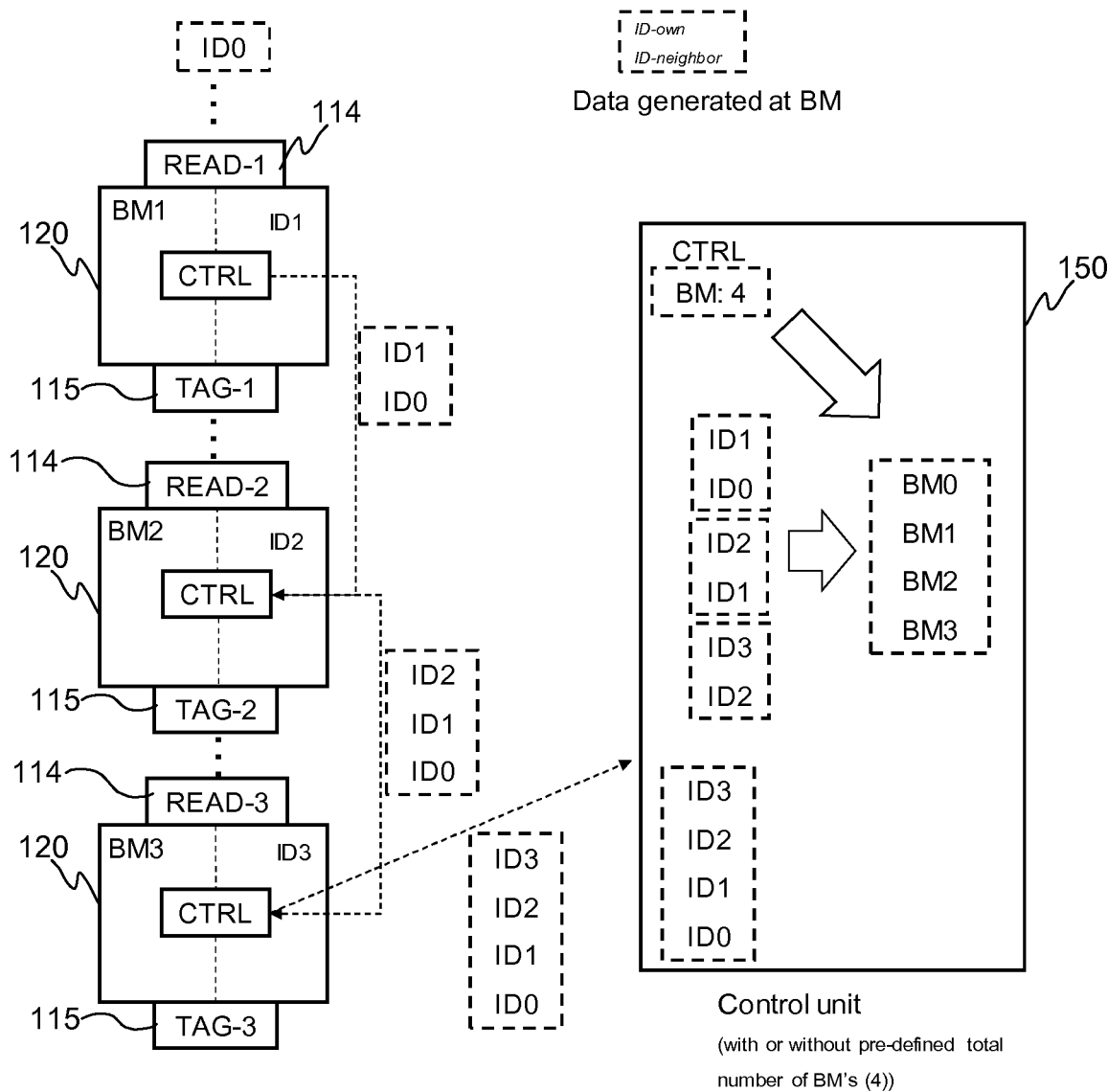

FIG. 6E: A further sophisticated solution for determining the configuration of the battery pack 100 can be based on an idea that the battery modules 120, e.g. through RFID readers 114, can be arranged to communicate with each other. At least one of the battery modules 120 can be arranged to communicate with the control unit 150. In this kind of implementation, e.g., in a mesh-type communication, the battery module 120 configured to communicate with the control unit 150 in addition to a communication of at least one other battery module 120 can be arranged to gather detection data, i.e. the identities, from other battery modules 120 and establish a data record including the data received from other modules and derived internally.

In response to the receipt of the data record the control unit 150 can be configured and arranged to generate a model of the configuration of the battery pack 100 in the same manner as described. In other words, the second data transmitted by the battery module 120 communicating with the control unit 150 can include further data including identifiers of from detections by the other battery modules 120, e.g., a meshed chain of identities. This kind of arrangement has at least an exemplary advantage that the communication of the control unit 150 can be optimized, since it needs to communicate with one, or possibly with some, battery module 120. Moreover, the exemplary embodiment of FIG. 6E can also be based on an arrangement in which the control unit 150 receives the data indicating the number of battery modules 120 belonging to the battery pack, such as to the string of battery modules 120.

Exemplary embodiments can also be used for determining a number and/or configuration of other types of modules than battery cells and battery modules. Not only can it be used for battery system up to container level, but the same type of automatic configuration can be used for complete containers regardless of their content, for electronics in high numbers like diesel cylinder controllers, and in a system the configurations on many levels can simultaneously be automatically detected. From packages inside a container to strings of containers and all the way to a complete container ship or container harbour, the hierarchical physical location of every physical unit can be automatically detected.

Figure 7:
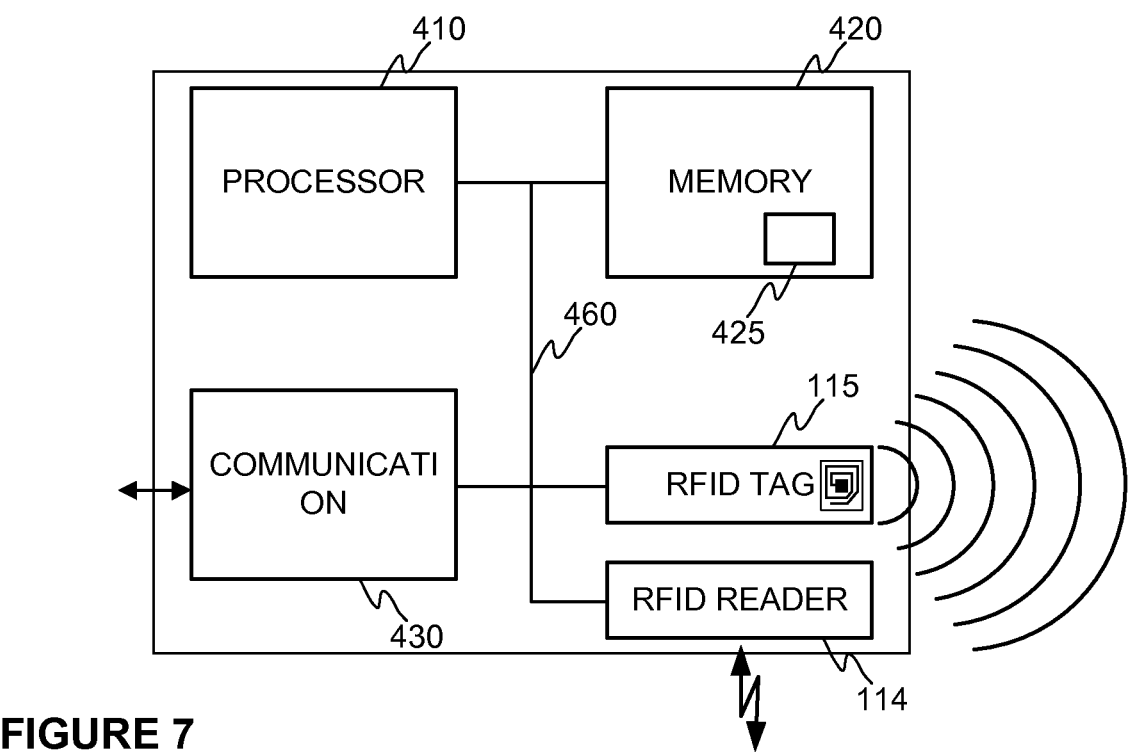
FIG. 7 illustrates schematically a RFID module according to an exemplary embodiment.

For sake of completeness FIG. 7 illustrates a RFID module according to an exemplary embodiment as a simplified block diagram. The RFID module includes a processor 410 and a memory 420 storing data and computer program code 425. The RFID module can include communication means 430, such as a communication interface, for wired or wireless communication with other apparatuses, such as with the control unit 150. and/or user I/O (input/output) components. Additionally, the RFID module includes at least RFID reader unit 114 having at least an antenna for communicating with one or more RFID tags 115 of other RFID modules.

Depending on an implementation the RFID module can include a RFID tag 115, but it can also be a separate entity to the RFID module. The mentioned entities in the RFID module can be communicatively coupled to each other via a bus 460 that enables transfer of data and control information between the components. The example of RFID module as illustrated in FIG. 7 is a non-limiting example of the entity, and RFID modules having another implementation can be used. In the non-limiting example of FIG. 5 both the RFID reader 114 and the RFID tag 115 of the same RFID module are schematically illustrated to reside in the same housing, but it can also be arranged that they are distinct entities arranged in the same battery cell 110, e.g., in a manner as schematically illustrated in FIG. 1.

It should be noted that the examples described herein and illustrated in at least some of the Figures are conceptual ones and omit a number of elements which could be included in a real-life solution for determining a configuration of battery pack 100, and they can be varied or complemented in a number of ways without departing from the scope for determining a configuration of battery pack 100 as is described in the present disclosure. As an example, in this regard, the battery modules 120 of the battery pack 100 can be a single RFID module, two or more RFID modules 115 arranged in a single physical location in the battery module 120 or in a plurality of locations both arrange to transmit the same identifier or different identifier. Further, the control unit 150 can be associated with the battery modules 120 or it can be remotely located, e.g., over a distance a direct communication can be arranged with the control unit 150 and the RFID modules residing in the battery pack 100. Moreover, the control unit 150 should be construed as a logical entity, that can be provided as one or more separate entities or components, some of which can be co-located with the other elements as, e.g., depicted in the example of FIG. 1 and some of which can be remotely located. However, the framework of FIG. 1 is sufficient for description of various characteristics of solution for determining the configuration of the battery pack 100 according to the present disclosure.

In the foregoing description of some embodiments it is derivable that for one battery pack 100 there is arranged only one control unit 150. However, the present invention is not only limited to such an implementation. For example, in a battery pack 100 there can be a plurality of control units 150 each arranged to determine a configuration of a predetermined number of battery modules 120 belonging to the battery pack 100. The control units 150 can be arranged to communicate with each other, and it can, e.g., be arranged such that only one of the control units 150 is arranged to determine the configuration of the whole battery pack 100 e.g. for maintenance purposes.

An exemplary outcome of the solution according to the present disclosure is an ability of such a system to perform a determination of a configuration of a battery pack, and, hence, a location battery cells therein. This allows swapping of faulty units without the need of a manual configuration of the system.

The specific examples provided in the description given above should not be construed as limiting the applicability and/or the interpretation of the appended claims. Lists and groups of examples provided in the description given above are not exhaustive unless otherwise explicitly stated.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A computer implemented method for determining a configuration of a battery pack having one or more battery modules configured to be operationally connected as a string of battery modules, wherein a battery module includes a radio frequency identification (RFID) reader configured to read a RFID tag of an adjacent battery module, the method comprising:
    receiving first data from a first battery module (BM1), wherein the first data includes a module identifier of the first battery module (BM1) associated with second data of a second battery module (BM2) adjacent to the first battery module (BM1), the second data including at least a module identifier of the second battery module (BM2);
    determining a number of the battery modules belonging to the battery pack based on the first data and the second data; and
    determining the configuration of the battery pack based on:
        the first data, the second data, and the number of the battery modules belonging to the battery pack; and
        an identifier of a frame tag, wherein a position of the frame tag within the battery pack is known.

2. The computer implemented method of claim 1, wherein the configuration of the battery pack is determined by:
    detecting an identifier of the RFD control reader as the first data; and
    applying a known position of the RFID control reader in the configuration of the battery pack in the determination.

3. The computer implemented method of claim 1, wherein the data received from the first battery module (BM1) comprises:
    further data containing at least one further identifier received from at least one further battery module (BMn).

4. The computer implemented method of claim 1, wherein the configuration of the battery pack is determined by detecting an identifier of the RFID control reader as the first data.

5. The computer implemented method of claim 4, the method comprising:
    determining data indicating a number of the battery modules belonging to a string of battery modules.

6. The computer implemented method of claim 5, wherein the configuration of the battery pack is determined by:
    applying the data indicating the number of the battery modules in the determination.

7. The computer implemented method of claim 6, wherein the battery pack comprises:
    the string of battery modules.

8. The computer implemented method of claim 1, wherein the battery module corresponds to a battery cell.

9. The computer implemented method of claim 1, wherein the battery pack corresponds to the battery module.

10. A control unit for determining a configuration of a battery pack having one or more battery modules configured to be operationally connected as a string of battery modules, wherein a battery module includes a radio frequency identification (RFID) reader configured to read a RFID, tag of an adjacent battery module, the control unit comprising:
    at least one processor; and
    at least one memory including computer program code;
    the at least one memory and the computer program code being configured to, with the at least one processor, cause the control unit to:
        receive first data from a first battery module (BM1), wherein the first data includes a module identifier of the first battery module (BM1) associated with second data of a second battery module (BM2) adjacent to the first battery module (BM1), the second data including at least a module identifier of the second battery module (BM2);
        determine a number of the battery modules belonging to the battery pack based on the first data and the second data; and
        determine the configuration of the battery pack based on:
            the first data, the second data, and the number of the battery modules belonging to the battery pack; and
            an identifier of a frame tag, wherein a position of the frame tag within the battery pack is known.

11. The control unit of claim 10, wherein the control unit is configured to:
    determine the configuration of the battery pack by detecting an identifier of the RFD control reader as the first data; and
    apply a known position of the RFID control reader in the configuration of the battery pack in the determination.

12. The control unit of claim 11, wherein the control unit is configured to:
    receive further data from the first battery module (BM1), the further data including at least one further identifier received from at least one further battery module (BMn).

13. The control unit of claim 11, comprising:
    the RFID control reader, wherein the control unit is configured to determine the configuration of the battery pack by detecting an identifier of the RFID control reader as the first data.

14. The control unit of claim 13, wherein the control unit is configured to:
    determine data indicating a number of the battery modules belonging to a string of battery modules; and
    determine the configuration of the battery pack by applying the data indicating the number of the battery modules in the determination.

15. The control unit of claim 14, wherein the battery pack comprises:
the string of battery modules.

16. A computer program embodied on a non-transitory computer readable medium containing computer executable program code, which code, when executed by at least one processor of a control unit, causes the control unit to:
receive first data from a first battery module (BM1), wherein the first data includes a module identifier of the first battery module (BM1) associated with second data of a second battery module (BM2) adjacent to the first battery module (BM1), the second data including at least a module identifier of the second battery module (BM2);
determining a number of the battery modules belonging to the battery pack based on the first data and the second data; and
determine the configuration of the battery pack based on:
the first data, the second data, and the number of the battery modules belonging to the battery pack; and
an identifier of a frame tag, wherein a position of the frame tag within the battery pack is known.

* * * * *